(12) United States Patent
Kim et al.

(10) Patent No.: US 11,347,451 B2
(45) Date of Patent: May 31, 2022

(54) USER ACCOUNT MANAGEMENT BASED ON BLOCKCHAIN IN IMAGE FORMING DEVICE

(71) Applicant: Hewlett-Packard Development Company, L.P., Spring, TX (US)

(72) Inventors: Sejong Kim, Seongnam-si (KR); Jung-Hun Kim, Seongnam-si (KR); Sangmi Kim, Seongnam-si (KR); Hyun-woo Yoo, Seongnam-si (KR)

(73) Assignee: Hewlett-Packard Development Company, L.P., Spring, TX (US)

( * ) Notice: Subject to any disclaimer, the term of this patent is extended or adjusted under 35 U.S.C. 154(b) by 18 days.

(21) Appl. No.: 17/259,997

(22) PCT Filed: Jul. 8, 2019

(86) PCT No.: PCT/US2019/040785
§ 371 (c)(1),
(2) Date: Jan. 13, 2021

(87) PCT Pub. No.: WO2020/146008
PCT Pub. Date: Jul. 16, 2020

(65) Prior Publication Data
US 2021/0279014 A1    Sep. 9, 2021

(30) Foreign Application Priority Data

Jan. 10, 2019    (KR) .................... 10-2019-0003382

(51) Int. Cl.
*G06F 3/12* (2006.01)
*G06F 16/27* (2019.01)
(Continued)

(52) U.S. Cl.
CPC .......... *G06F 3/1222* (2013.01); *G06F 3/1238* (2013.01); *G06F 16/27* (2019.01);
(Continued)

(58) Field of Classification Search
None
See application file for complete search history.

(56) References Cited

U.S. PATENT DOCUMENTS 10,771,639 B1 * 9/2020 Kosaka ................ G06F 3/1267
2016/0212297 A1    7/2016 Nagasawa
(Continued)

FOREIGN PATENT DOCUMENTS

JP        2018-516030 A    6/2018
WO   WO-2018/100227 A1   6/2018

*Primary Examiner* — Haris Sabah
(74) *Attorney, Agent, or Firm* — Jefferson IP Law, LLP

(57) ABSTRACT

An image forming device and an operating method of an image forming device are provided. The operating method includes receiving first authentication information of a first user with respect to the image forming device, authenticating the first authentication information of the first user, based on reference account information of a plurality of users, the reference account information being stored in a storage based on a blockchain that distributes and manages a ledger in which user account information including authentication information and authority information of a user with respect to a certain image forming device has been recorded, when the authentication of the first user is completed, receiving a request to perform a first image forming job, and evaluating first authority information indicating an authority range of the first user, based on the reference account information of the plurality of users, and performing the first image forming job within the authority range of the first user.

15 Claims, 14 Drawing Sheets

(51) Int. Cl.
*G06F 21/31* (2013.01)
*G06F 21/60* (2013.01)
*H04L 9/32* (2006.01)
*G06F 3/06* (2006.01)

(52) U.S. Cl.
CPC .......... *G06F 21/31* (2013.01); *G06F 21/608*
(2013.01); *H04L 9/3239* (2013.01); *G06F*
*3/0637* (2013.01); *G06F 3/1273* (2013.01);
*G06F 3/1288* (2013.01); *H04L 2209/38*
(2013.01)

(56) References Cited

U.S. PATENT DOCUMENTS

| | | |
|---|---|---|
| 2016/0342994 A1 | 11/2016 | Davis |
| 2017/0279783 A1 | 9/2017 | Milazzo et al. |
| 2017/0329996 A1 | 11/2017 | Wilson |
| 2017/0330180 A1 | 11/2017 | Song et al. |
| 2018/0039667 A1 | 2/2018 | Pierce et al. |
| 2018/0084153 A1* | 3/2018 | Totsuka ............... H04N 1/4433 |
| 2018/0107438 A1* | 4/2018 | Takeuchi ............. G06F 3/1298 |
| 2018/0136633 A1 | 5/2018 | Small et al. |
| 2018/0331837 A1* | 11/2018 | Uhr ...................... H04L 9/3236 |
| 2020/0074168 A1* | 3/2020 | Godefroy ............... G06F 16/93 |

\* cited by examiner

USER ACCOUNT MANAGEMENT BASED ON BLOCKCHAIN IN IMAGE FORMING DEVICE

BACKGROUND

A user may establish an account for connection to an image forming device in order to use a certain function of the image forming device. To prevent indiscriminate use of the image forming device and provide information security, the certain functions that the user can use in the image forming device may be set differently for different accounts of different users.

BRIEF DESCRIPTION OF DRAWINGS

This disclosure may be readily understood by reference to the following description and the accompanying drawings, in which.

DESCRIPTION OF EXAMPLES

Figure 1:
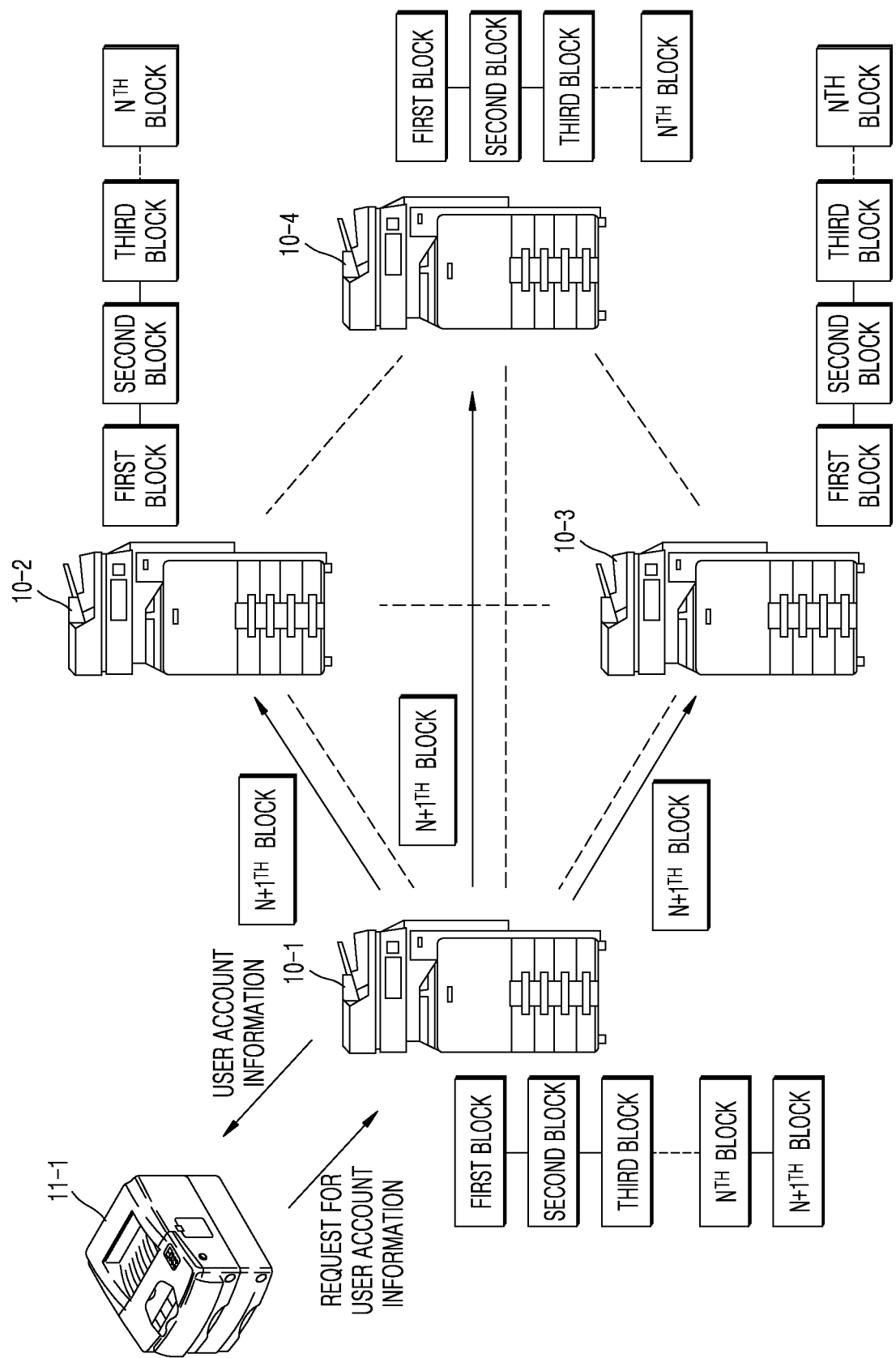
FIG. 1 is a conceptual view illustrating operations of a plurality of nodes to manage user account information of an image forming device, based on a blockchain, according to an example.

Various examples now will be described more fully hereinafter with reference to the accompanying drawings. The examples described hereinafter may be modified in many different forms.

The term "image forming device" as used herein may refer to any type of device capable of performing an image forming job, such as a printer, a copier, a scanner, a fax machine, a multi-function printer (MFP), or a display device. The term "image forming job" as used herein may be refer to a job, such as printing, copying, scanning, or faxing.

The term "blockchain" as used herein may denote a distributed peer to peer (P2P) system of a ledger using a software element consisting of an algorithm in which blocks connected according to an order negotiate transaction information by using an encrypting technique and a security technology, so as to secure and maintain integrity. Also, the term "blockchain" may denote a distributed ledger technology in which a ledger in which transaction information is recorded is distributed in a P2P network instead of a central server of a specific organization and is commonly recorded and managed by nodes in the P2P network. The transaction information recorded in the ledger may be user account information.

The term "node" as used herein may denote an element in a network of a blockchain. For example, a "node" may be an image forming device, a network attached storage (NAS), a server, or the like.

The term "user account information" as used herein may include authentication information for identifying a user when the user uses an image forming device, and authority information about a permitted item capable of being used when the user uses the image forming device and a restricted item incapable of being used when the user uses the image forming device.

The term "authentication information" as used herein may refer to information for identifying a user when the user uses an image forming device. For example, the authentication information may include identification (ID) of a user, a name of the user, a password, an email address, a phone number, an address, an authorization ID mapped to the ID of the user, an authentication certificate, or the like. Also, the authentication information may include information for identifying the user, such as a fingerprint, a voice, an iris, or the like of the user.

Further, the term "authority information" as used herein may refer to information representing an authority range within which a user may use an image forming device. For example, the authority information may include information about whether the entirety or a portion of a certain function of the image forming device may be used, and restriction information such as the number of times the certain function of the image forming device is used and the number of paper sheets.

The term "reference account information" as used herein may refer to information serving as a basis when user account information of a certain user is determined.

Examples are described herein with reference to the accompanying drawings so that this disclosure may be easily performed by one of ordinary skill in the art to which the disclosure pertain. The disclosure may, however, be embodied in many different forms and should not be construed as being limited to the examples set forth herein.

FIG. 1 is a conceptual view illustrating operations of a plurality of nodes to manage user account information of an image forming device, based on a blockchain, according to an example.

Referring to FIG. 1, a plurality of nodes 10-1, 10-2, 10-3, and 10-4 may manage user account information, based on a blockchain. Each of the plurality of nodes 10-1, 10-2, 10-3, and 10-4 may be an image forming device, an NAS, a server, or the like.

For example, in a first image forming device 10-1 from among the nodes 10-1, 10-2, 10-3, and 10-4, a block in which user account information has been recorded may be generated. The user account information may be account information of a new user or changed account information of an existing user. The generated block may be connected to an $N+1^{th}$ block, which is next to an $N^{th}$ block within the blockchain. The user account information may be managed via one ledger connected to a plurality of blocks. The first image forming device 10-1 may transmit the generated block to the nodes 10-2, 10-3, and 10-4 on a network of the blockchain. The nodes 10-2, 10-3, and 10-4 may receive the block generated by the first image forming device 10-1 and may add the block to blockchains respectively possessed by the nodes 10-2, 10-3, and 10-4. In other words, when a block having user account information recorded therein is generated in one of the plurality of nodes 10-1, 10-2, 10-3, and 10-4, the generated block may be transmitted to the other nodes and added to the blockchains. Accordingly, the plurality of nodes 10-1, 10-2, 10-3, and 10-4 may possess blockchains in which blocks including identical user account information recorded therein are connected to each other. Because the plurality of nodes 10-1, 10-2, 10-3, and 10-4 manage user account information through the blockchains, no special servers are needed. The plurality of nodes 10-1, 10-2, 10-3, and 10-4 may manage the user account information recorded on the blockchains, by synchronizing the user account information with reference account information of a plurality of users stored in a storage (e.g., a memory).

A second image forming device 11-1 outside the network of the blockchain may request the first image forming device 10-1 for user account information. The first image forming device 10-1 may transmit the ledger to the second image forming device 11-1. The first image forming device 10-1 may transmit the reference account information of the plurality of users stored in the storage to the second image forming device 11-1.

Figure 2:
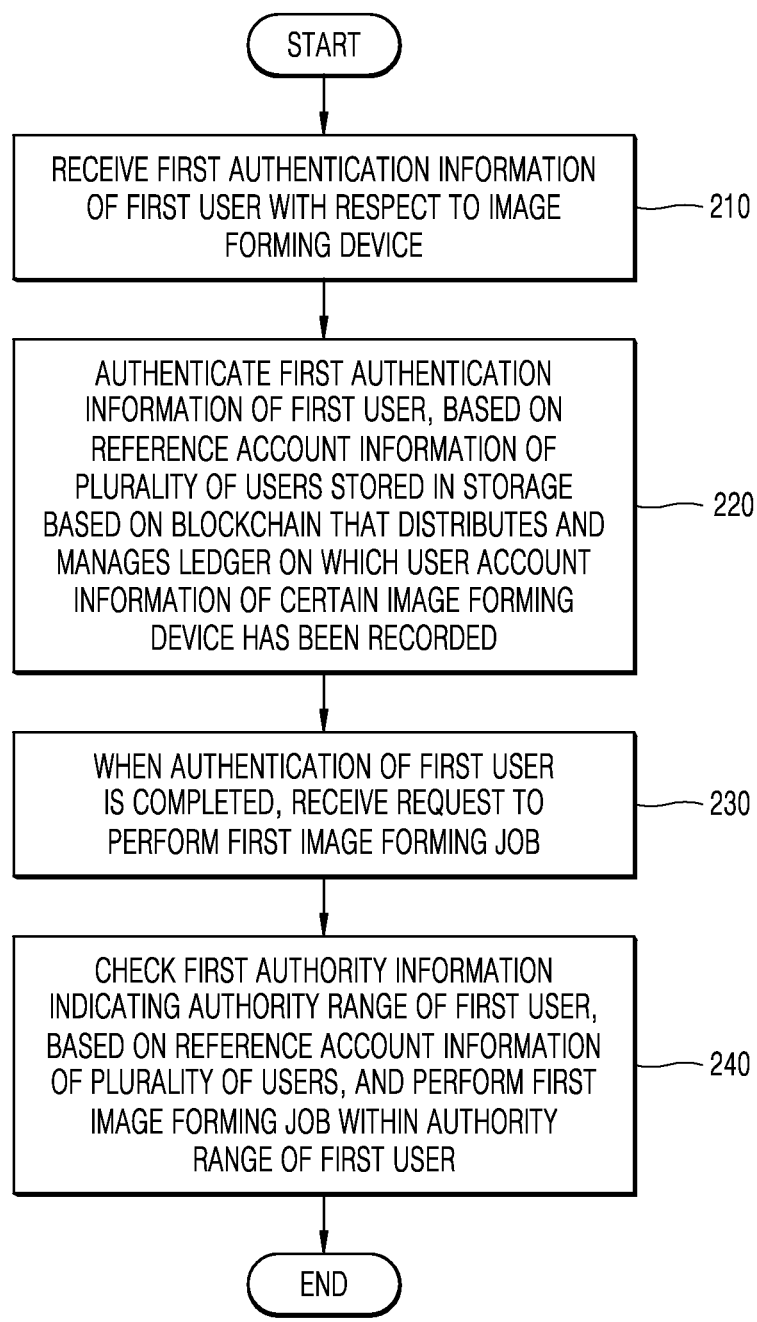
FIG. 2 is a flowchart of an operating method of an image forming device, according to an example.

FIG. 2 is a flowchart of an operating method of an image forming device, according to an example.

Referring to FIG. 2, in operation 210, the image forming device may receive first authentication information of a first user with respect to the image forming device. For example, the image forming device may receive ID information of the first user and password (PW) information with respect to the ID of the first user, through a user interface device.

In operation 220, the image forming device may authenticate the first authentication information of the first user, based on reference account information of a plurality of users stored in a storage based on a blockchain.

The blockchain may distribute and manage a ledger in which user account information has been recorded. The user account information may include authentication information used to authenticate a user of the image forming device, and authority information indicating an authority range within which the user may use the image forming device. The ledger may include a first ledger in which authentication information is recorded, and a second ledger in which authority information is recorded. The first ledger and the second ledger may exist independently.

The reference account information of the plurality of users stored in the storage may be information with which the user account information recorded in the ledger is synchronized. The image forming device may perform authentication of the first user by determining if first reference account information of the first user within the storage is identical with the first authentication information of the first user.

In operation 230, when the authentication of the first user is completed, the image forming device may receive a request to perform a first image forming job. For example, an image forming job may be copying, printing, scanning, faxing, scanning to e-mailing, scanning to fax, or the like. In an example, the image forming device may receive a request to perform a first image forming job indicating printing with respect to a certain file, through a user interface device.

In operation 240, the image forming device may evaluate first authority information indicating an authority range of the first user, based on the reference account information of the plurality of users. The image forming device may perform the first image forming job within the authority range of the first user.

An authority range within which a user may use an image forming device may be set differently for different users. Accordingly, the image forming device may determine whether the first image forming job is within the authority range of the first user based on the reference account information of the plurality of users. When the first image forming job is within the authority range of the first user, the image forming device may perform the first image forming job. On the other hand, when the first image forming job is not within the authority range of the first user, the image forming device may display a message informing that the first image forming job cannot be performed.

Although an operation of referring to reference account information of a user stored in a storage in order for an image forming device to authenticate the user and determine an authority range of the user has been described above with reference to FIG. 2, the image forming device may authenticate a user and determine an authority range of the user by referring to a ledger.

Figure 3:
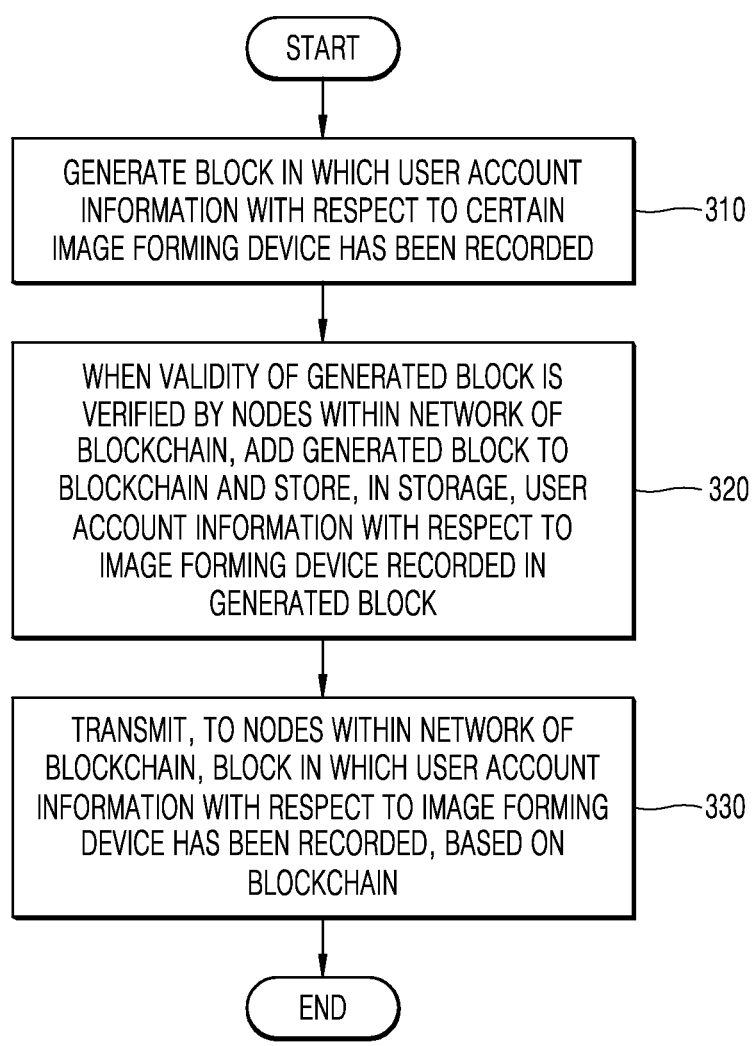
FIG. 3 is a flowchart of an operating method of an image forming device, according to an example.

FIG. 3 is a flowchart of an operating method of an image forming device, according to an example.

Referring to FIG. 3, in operation 310, the image forming device may generate a block in which user account information with respect to the image forming device has been recorded. An example of generating a block in the image forming device will be described below with reference to FIG. 4.

For example, the image forming device may generate a first block in which certain authentication information of a new user or certain authority information of the new user has been recorded.

As another example, the image forming device may generate a second block in which changed information obtained by changing second authentication information or second authority information of a second user from among a plurality of users has been recorded. The plurality of users are users of which user account information has been recorded within the blocks of a blockchain.

In operation 320, when validity of the generated block is verified by nodes within a network of a blockchain, the image forming device may add the generated block to the blockchain. The image forming device may store, in a storage, the user account information with respect to the image forming device recorded in the generated block.

The image forming device may generate a second block in which second account information of a second user has been recorded. The image forming device may receive, from a certain node from among the nodes, a third block in which third account information of the second user has been recorded. The image forming device may determine, as a valid block, a block corresponding to an earlier time point from among a time point at which the second account information is agreed from the nodes and a time point at which the third account information is agreed from the nodes. The image forming device may add the valid block to the blockchain.

For example, the image forming device may generate account information of a new user including information recorded in the first block. The image forming device may add the account information of the new user to reference account information of the plurality of users stored in a storage.

As another example, the image forming device may update second reference account information of the second user stored in the storage based on the changed information of the user account information of the second user recorded in the second block.

As another example, the image forming device may receive a request for a plurality of pieces of user account information from an external image forming device other than the nodes within the network of the blockchain. The image forming device may synchronize the reference account information of the plurality of users stored in the storage with user account information recorded in a ledger. The image forming device may transmit the reference account information of the plurality of users to the external image forming device.

In operation 330, the image forming device may transmit, to the nodes within the network of the blockchain, the block in which the user account information with respect to the image forming device has been recorded, based on the blockchain.

Figure 4:
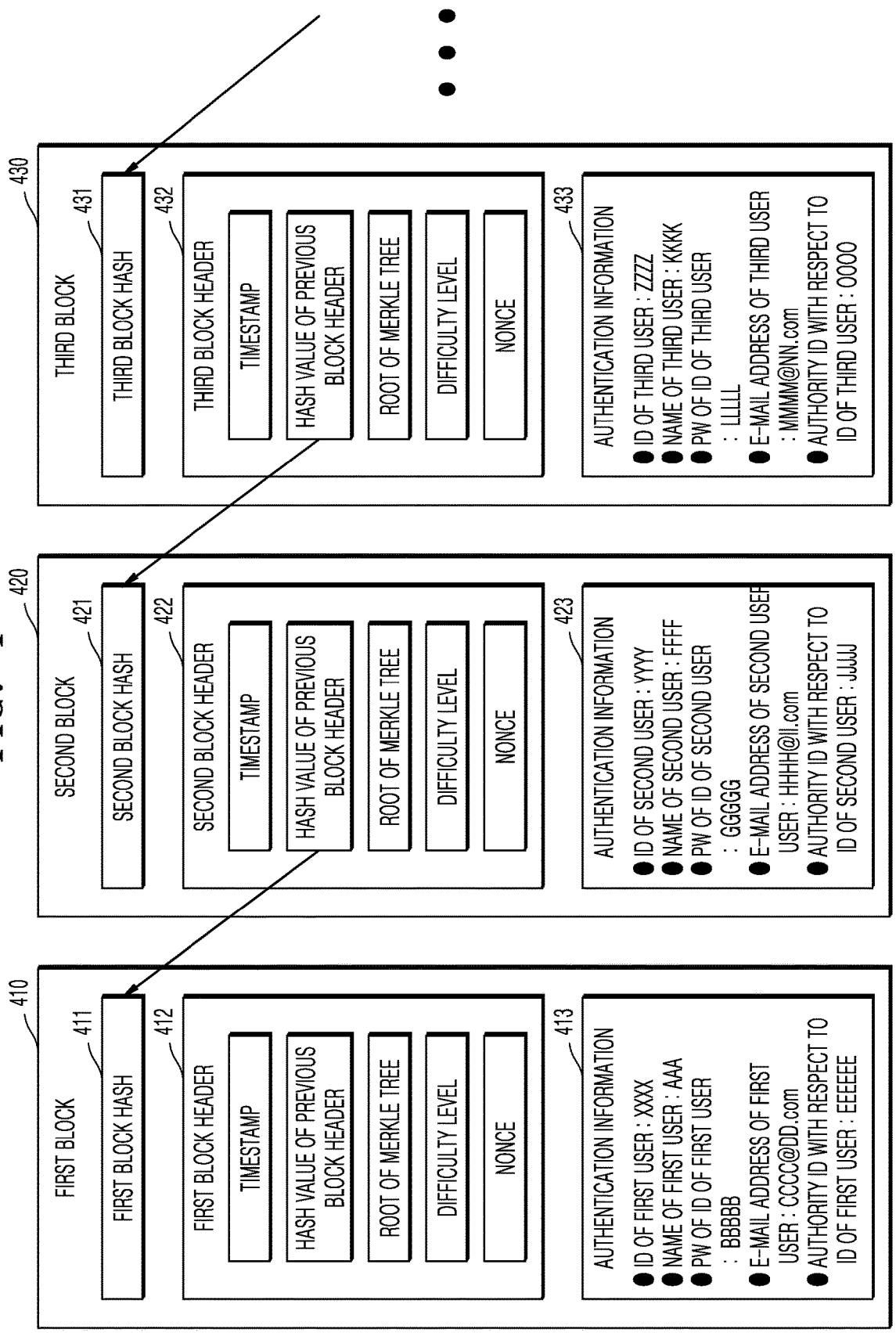
FIG. 4 is a diagram for describing structures of blocks in which authentication information of users has been recorded and a structure of a blockchain in which the blocks are connected, according to an example.

FIG. 4 is a diagram for describing structures of blocks in which authentication information of users has been recorded and a structure of a blockchain in which the blocks are connected, according to an example.

Referring to FIG. 4, a blockchain may be configured when blocks in which valid authentication information has been recorded are connected to each other. A data structure of the blockchain may be a certain data structure in which blocks having authentication information recorded therein are configured in sequentially aligned units. Also, the data structure of the blockchain may include a data structure in which block headers are connected in a chain form by referring to a previous block header and a data structure of a Merkle tree in which a hash reference indicating data of authentication information and the data of the authentication information are connected in a tree form.

Each block may include a block hash, a block header, authentication information, and the like. The block header may include information of a timestamp, a hash value of a previous block header, a root of a Merkle tree, a difficulty level, and a nonce value. Referring to FIG. 4, a blockchain of a certain node may be connected by a first block 410, a second block 420, and a third block 430. The first through third blocks 410 through 430 may respectively include a first hash 411, a second hash 421, and a third hash 431, a first header 412, a second header 422, and a third header 432, and a first piece of authentication information 413, a second piece of authentication information 423, and a third piece of authentication information 433. Authentication information of a first user may be recorded in the first block 410, authentication information of a second user may be recorded in the second block 420, and authentication information 433 of a third user may be recorded in the third block 430. Authentication information may include information about a user, such as an ID of the user, a name of the user, a PW of the ID of the user, an e-mail address of the user, an authority ID with respect to the ID of the user, or the like. Although authentication information of one user is recorded in each of the first through third blocks 410 through 430 in FIG. 4, authentication information of a plurality of users may be recorded therein.

When describing elements that form a block, a block hash may be a hash value of a hash function applied by using, as input values, information of a timestamp, a hash value of a previous block header, a root of a Merkle tree, a difficulty level, and a nonce value. In other words, a value of the block hash is not a value obtained by hashing an entire block but by hashing a block header.

A hash value of a previous block header may be used to intrinsically identify each block header and refer to the previous block header. When each block header refers to a previous block header, an order of individual block headers and blocks may be maintained. Referring to FIG. 4, since the first block 410 is an initial block, there is no previous block and thus there is no reference indicating a previous block header. Accordingly, a hash value of a previous block header of the first block 410 is 0. Also, since a previous block of the second block 420 is the first block 410, a hash value of a previous block header of the second block 420 has a first block hash 411 of a first block header 412. Also, since a previous block of the third block 430 is the second block 420, a hash value of a previous block header of the third block 430 has a second block hash 421 of a second block header 422.

A Merkle tree may denote a structure in which a hash reference and data of authentication information are connected in a tree form. The hash reference may denote an indication of the data of the authentication information by using an encryption hash value. Meanwhile, since the encryption hash value is an intrinsic value of data, different pieces of data do not have a same hash value.

A timestamp may denote a time at which a job is started for job verification. A difficulty level may denote a constraint condition in a job verification or a hash puzzle. A nonce value may denote a value that may be adjusted such that a value of a block hash satisfies a constraint condition for job verification.

Examples of processes in which a first node possesses a blockchain including the first and second blocks 410 and 420 and the third block 430 to be added to the blockchain is generated will be described. The first node may calculate a root of a Merkle tree with respect to authentication information 433. The first node may generate a hash reference indicating a previous block header in terms of the third block 430 to be added to the blockchain. The first node may obtain a difficulty level required for job verification or constraint condition of the third block 430 to be added to the blockchain. The first node may identify whether a value of a block hash satisfies the constraint condition by applying a hash function to the root of the Merkle tree, the hash reference indicating the previous block header, the difficulty level, data of a timestamp, and the nonce value. For example, the first node may perform job verification on a candidate block by obtaining a nonce value satisfying a constraint condition by increasing the nonce value by 1 from 0. Here, the candidate block may denote a block in a state before job verification is completed. The first node may add the candidate block as the valid third block 430 to the blockchain. The first node may transmit the third block 430 to other nodes on a network of the blockchain.

Figure 5:
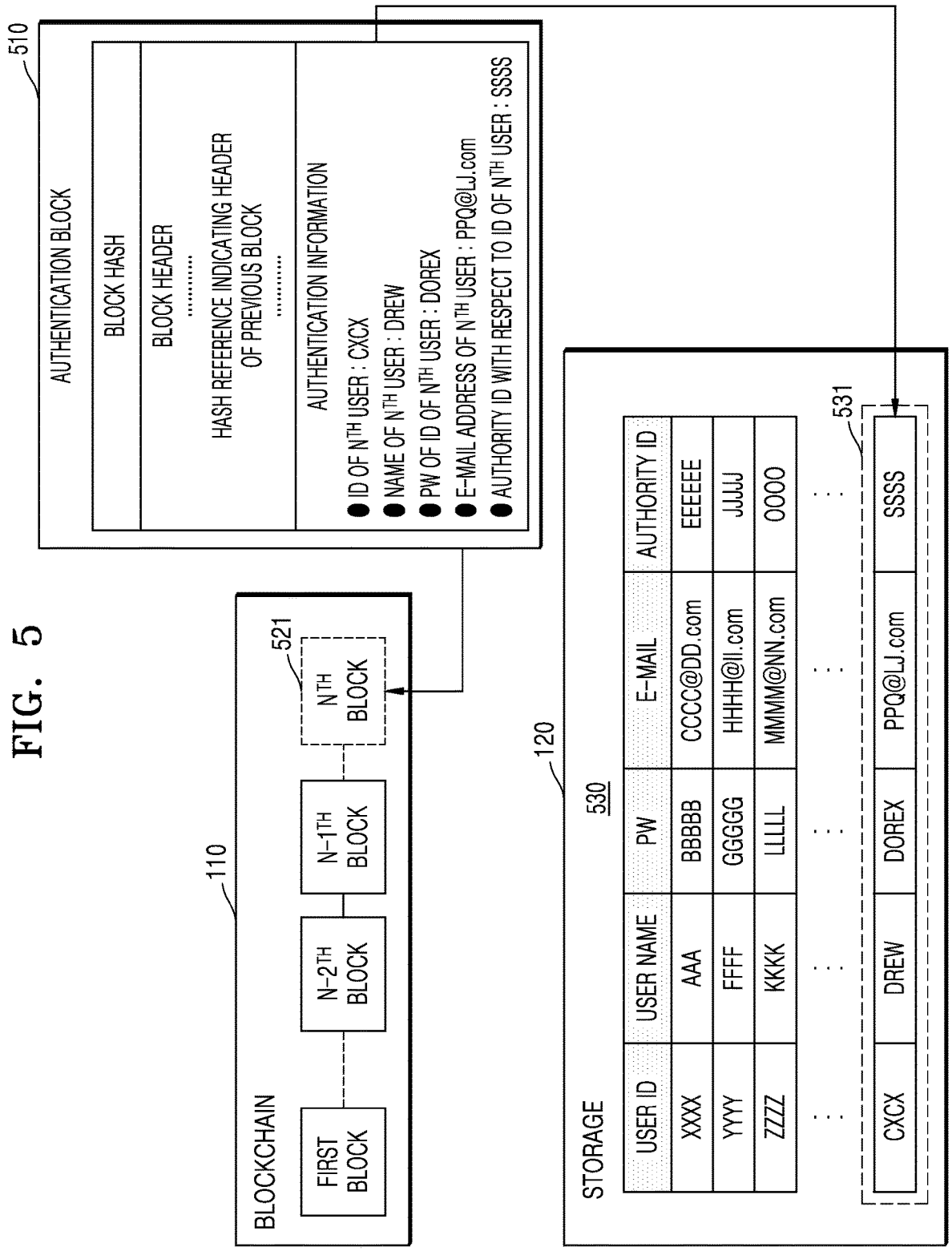
FIG. 5 is a diagram for explaining a process in which, when an authentication block in which authentication information has been recorded is generated, the generated authentication block is added to a blockchain and the authentication information is stored in a storage, according to an example.

FIG. 5 is a diagram for explaining a process in which, when an authentication block in which authentication information has been recorded is generated, the generated authentication block is added to a blockchain and the authentication information is stored in a storage, according to an example.

Referring to FIG. 5, the image forming device may obtain authentication information of a new user of the image forming device and generate an authentication block in which the authentication information of the new user has been recorded. The image forming device may generate an authentication block 510 including a block hash, a block header, and authentication information. Because descriptions of the block hash and the block header have already given above with reference to FIG. 4, they will not be repeated herein.

The authentication information within the authentication block 510 may include information about an $N^{th}$ user, such as an ID of the $N^{th}$ user, a name of the $N^{th}$ user, a PW of the $N^{th}$ user, an e-mail address of the $N^{th}$ user, and an authority ID with respect to the ID of the $N^{th}$ user. The image forming device may add the authentication block 510 to an $N^{th}$ block of a blockchain 110. The image forming device may transmit the $N^{th}$ block to nodes within a network of a blockchain.

The image forming device may add authentication information 531 of the $N^{th}$ user to reference account information 530 of a plurality of users within a storage 120. When the $N^{th}$ block is added to the blockchain 110 within the image forming device, the image forming device may store, in the storage 120, information that is the same as the authentication information stored in the $N^{th}$ block. The image forming device may receive a result informing that validity of the $N^{th}$ block has been verified from the nodes within the network of the blockchain. For example, when nodes exceeding 50% from among all of the nodes approve the authentication information written in the $N^{th}$ block, the validity of the $N^{th}$ block may be verified. When the validity of the $N^{th}$ block is verified, the image forming device may store, in the storage 120, information that is the same as the authentication information recorded in the $N^{th}$ block.

Figure 6:
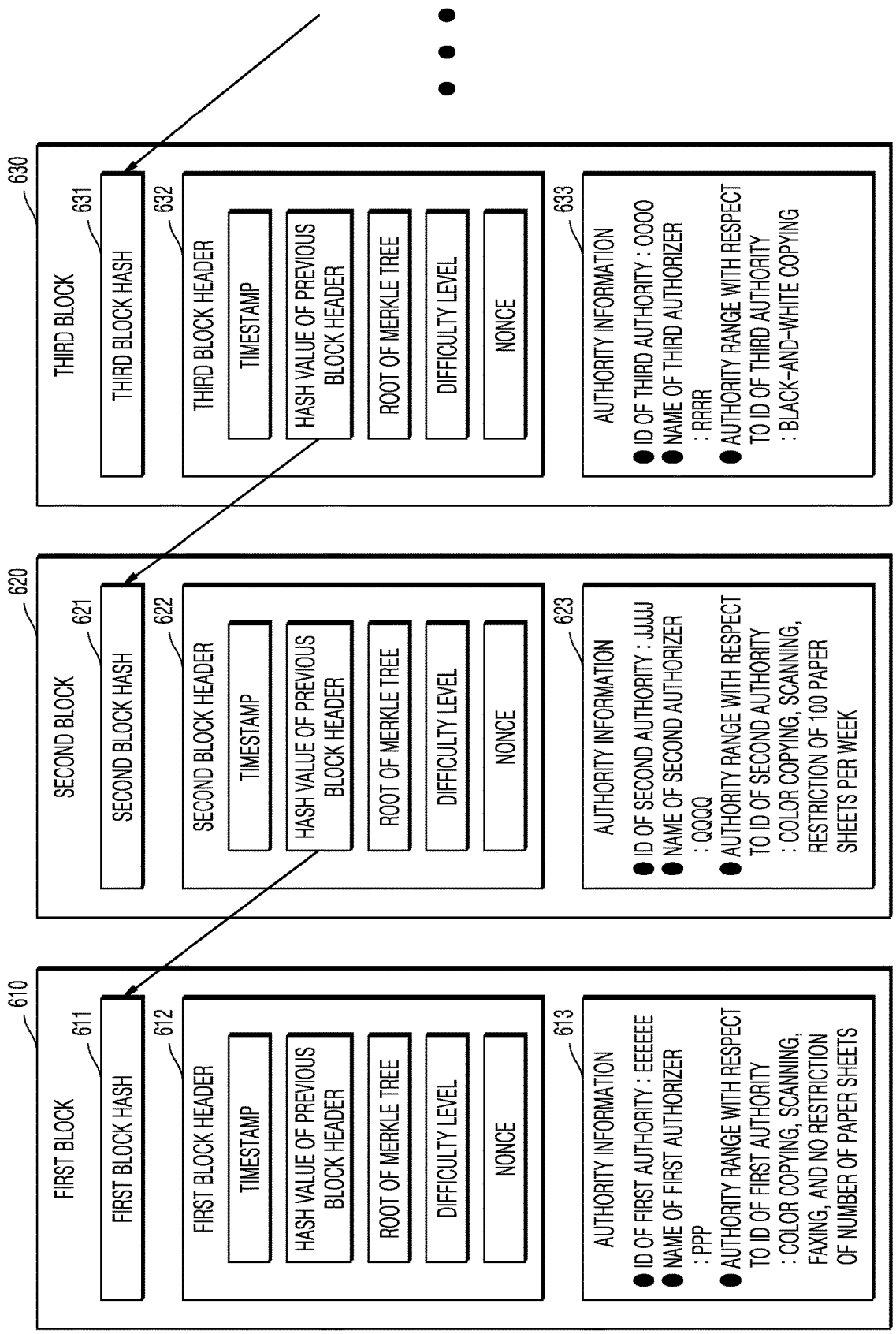
FIG. 6 is a diagram for describing structures of blocks in which authority information of users has been recorded and a structure of a blockchain in which the blocks are connected, according to an example.

FIG. 6 is a diagram for describing structures of blocks in which authority information of users has been recorded and a structure of a blockchain in which the blocks are connected, according to an example.

The structure of the blockchain of FIG. 6 is the same as that of FIG. 4. As such, descriptions given above with reference to FIG. 4 will be omitted here.

Referring to FIG. 6, the blockchain may be connected by a first block 610, a second block 620, and a third block 630. The first through third blocks 610 through 630 may respectively include a first block hash 611, a second block hash 621, and a third block hash 631, a first block header 612, a second block header 622, and a third block header 632, and a first piece of authority information 613, a second piece of authority information 623, and a third piece of authority information 633. Authority information of a first authorizer may be recorded in the first block 610, authority information of a second authorizer may be recorded in the second block 620, and authority information of a third authorizer may be recorded in the third block 630. Authority information may include information about an authorizer, such as an ID of an authority, a name of the authorizer, and an authority range with respect to the ID of the authority. Although authority information of one authorizer is recorded on each of the first through third blocks 610 through 630 in FIG. 6, a plurality of pieces of authority information may be recorded therein.

Figure 7:
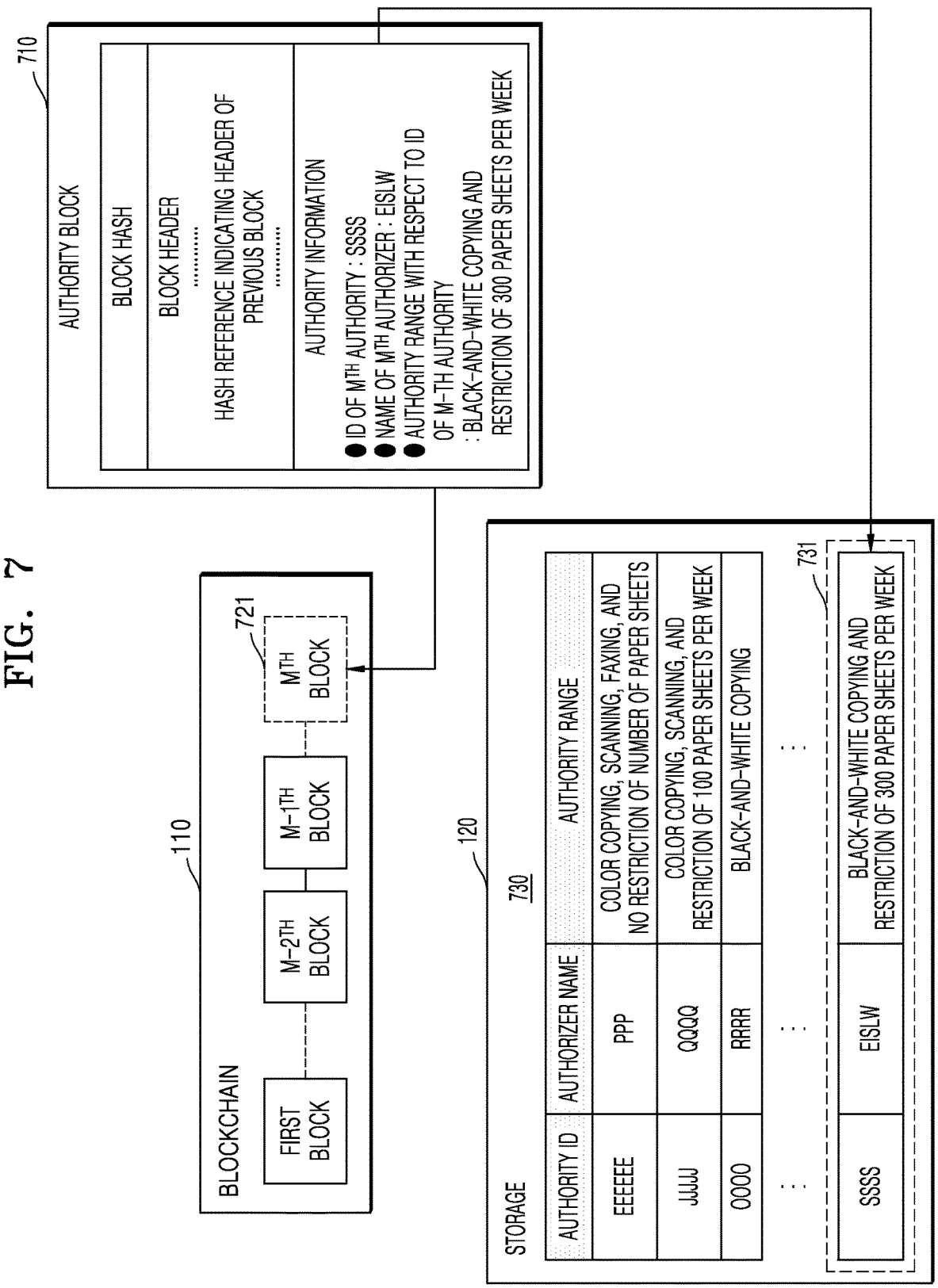
FIG. 7 is a diagram for explaining a process in which, when an authority block in which authority information has been recorded is generated, the generated authority block is added to a blockchain and the authority information is stored in a storage, according to an example.

FIG. 7 is a diagram for explaining a process in which, when an authority block in which authority information has been recorded is generated, the generated authority block is added to a blockchain and the authority information is stored in a storage, according to an example.

Authority of a user to use an image forming device may be set differently for different users. For example, users may be given different authority although the users belong to the same group. As another example, the users within a user group may be given the same authority.

When a new authority range within which the image forming device may be used is set, the image forming device may obtain new authority information and may generate an authority block in which the new authority information has been recorded. Referring to FIG. 7, the image forming device may generate an authority block 710 including a block hash, a block header, and authority information. Because descriptions of the block hash and the block header have already given above with reference to FIG. 4, they will not be repeated herein.

The authority information within the authority block 710 may include an ID of an $M^{th}$ authority, a name of an $M^{th}$ authorizer, and an authority range with respect to the ID of the $M^{th}$ authority. The image forming device may add the authority block 710 as an $M^{th}$ block 721 of the blockchain 110. The image forming device may transmit the $M^{th}$ block 721 to the nodes within the network of the blockchain.

The image forming device may add authority information 731 of the $M^{th}$ authority to reference account information 730 of the plurality of users within the storage 120. When the $M^{th}$ block is added to the blockchain 110 within the image forming device, the image forming device may store, in the storage 120, information that is the same as the authority information recorded in the $M^{th}$ block. The image forming device may receive a result informing that validity of the $M^{th}$ block has been verified from the nodes within the network of the blockchain. For example, when nodes exceeding 50% from among all of the nodes approve the authority information written in the $M^{th}$ block, the validity of the $M^{th}$ block may be verified. When the validity of the $M^{th}$ block is verified, the image forming device may store, in the storage 120, information that is the same as the authority information recorded in the $M^{th}$ block.

Figure 8:
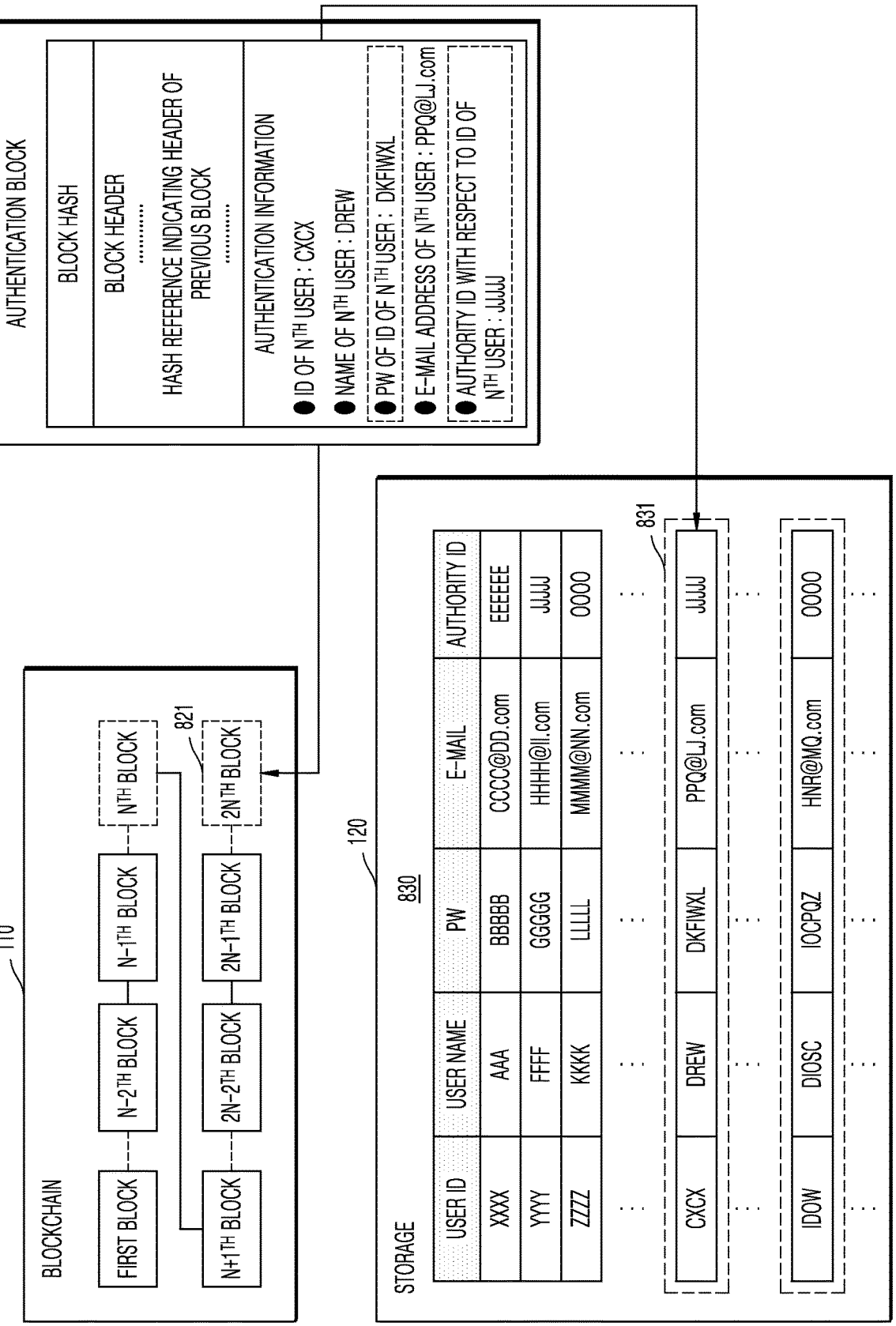
FIG. 8 is a diagram for explaining a process in which, when an authentication block in which changed authentication information of a user has been recorded is generated, the generated authentication block is added to a blockchain and authentication information in a storage is updated, according to an example.

FIG. 8 is a diagram for explaining a process in which, when an authentication block in which changed authentication information of a user has been recorded is generated, the generated authentication block is added to a blockchain and authentication information in a storage is updated, according to an example.

Referring to FIG. 8, the image forming device may receive an input of changing authentication information and authority information of an $N^{th}$ user from among a plurality of users. In other words, the image forming device may obtain changed information by changing account information of the $N^{th}$ user and generate an authentication block 810 in which the changed information has been recorded.

The authentication information within the authentication block 810 may include information about the $N^{th}$ user, such as an ID of the $N^{th}$ user, a name of the $N^{th}$ user, a PW of the $N^{th}$ user, an e-mail address of the $N^{th}$ user, and an authority ID with respect to the ID of the $N^{th}$ user. Only the PW of the $N^{th}$ user and the authority ID with respect to the ID of the $N^{th}$ user may be changed. As illustrated in FIG. 8, the authentication block 810 in which the changed information has been recorded may include changed information and unchanged information about the $N^{th}$ user. Alternatively, the authentication block 810 in which the changed information has been recorded may include only changed information about the $N^{th}$ user.

When 2N–1 blocks are connected in the blockchain 110, the image forming device may add the authentication block 810 as a $2N^{th}$ block 821 within the blockchain 110. The image forming device may transmit the $2N^{th}$ block 821 to the nodes within the network of the blockchain.

A changed authority ID with respect to the ID of the $N^{th}$ user is "JJJJJ", which is an existing authority ID. Because authority information related to the authority ID "JJJJJ" has already been recorded in the second block 620 of FIG. 6, the necessity to generate an authority block due to the changed authority ID with respect to the ID of the $N^{th}$ user is removed.

The image forming device may update the reference account information 830 of the plurality of users within the storage 120 with authentication information 831 of the $N^{th}$ user. For example, the image forming device may correct only changed information from among the account information of the $N^{th}$ user within the reference account information 830 of the plurality of users. As another example, the image forming device may delete existing account information of the $N^{th}$ user from the reference account information 830 of the plurality of users and may add new account information by reflecting the changed information.

To provide integrity of the reference account information 830 of the plurality of users stored in the storage 120, the image forming device may determine whether the reference account information 830 of the plurality of users stored in the storage 120 has been periodically synchronized with the user account information stored in a ledger, based on the blockchain 110. The image forming device may update the reference account information 830 of the plurality of users stored in the storage 120, based on a result of the determination of synchronization or non-synchronization. For example, when the account information of the third user has been changed, the changed account information of the third user may not be reflected in the reference account information 830 of the plurality of users stored in the storage 120. The image forming device may secure integrity of the reference account information 830 of the plurality of users stored in the storage 120 by periodically synchronizing the user account information stored in the ledger with the reference account information 830 of the plurality of users.

Figure 9:
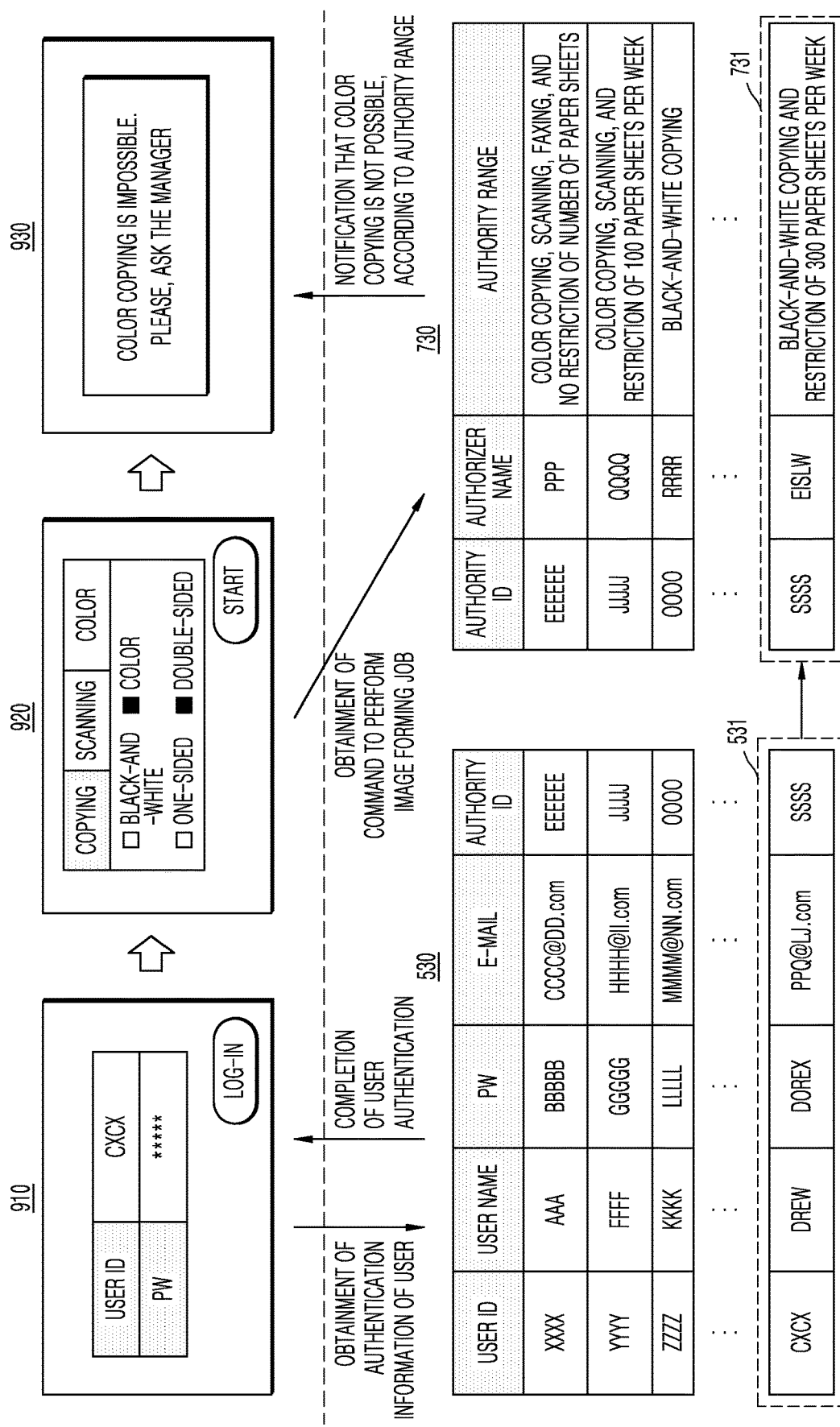
FIG. 9 is a diagram for explaining a process in which an image forming device performs user authentication and performs an image forming job according to an authority range, by using reference account information stored based on a blockchain, according to an example.

FIG. 9 is a diagram for explaining a process in which an image forming device performs user authentication and performs an image forming job according to an authority range, by using reference account information stored based on a blockchain, according to an example.

Referring to FIG. 9, the image forming device may receive first authentication information 910 of a first user through a user interface device. For example, the image forming device may receive "CXCX" as an ID of the first user and "*****" as a PW of the first user.

The image forming device may authenticate the first authentication information of the first user, based on the reference account information 530 of the plurality of users stored in the storage 120. For example, the reference account information 530 of the plurality of users may be information obtained based on a blockchain that distributes and manages the ledger in which the user account information has been recorded.

When the first authentication information is identical with first reference account information of the first user within the reference account information 530 of the plurality of users, the image forming device may authenticate the first user as a proper user of the image forming device.

When authentication of the first user is completed, the first user may request the image forming device to perform the first image forming job. As illustrated in FIG. 9, the image forming device may receive a request 920 to perform a first image forming job corresponding to "double-sided color copying" through a user interface device.

Referring to information indicating an authority ID of the first user from among the reference account information 730 of the plurality of users, the authority of the first user may be authority for black-and-white copying and a restriction of 300 paper sheets per week. The image forming device may display, through the user interface device, a message informing that the first image forming job of the first user is impossible. As illustrated in FIG. 9, the image forming device may display, through the user interface device, a message 930 indicating "Color copying is impossible. Please, ask the manager."

Figure 10:
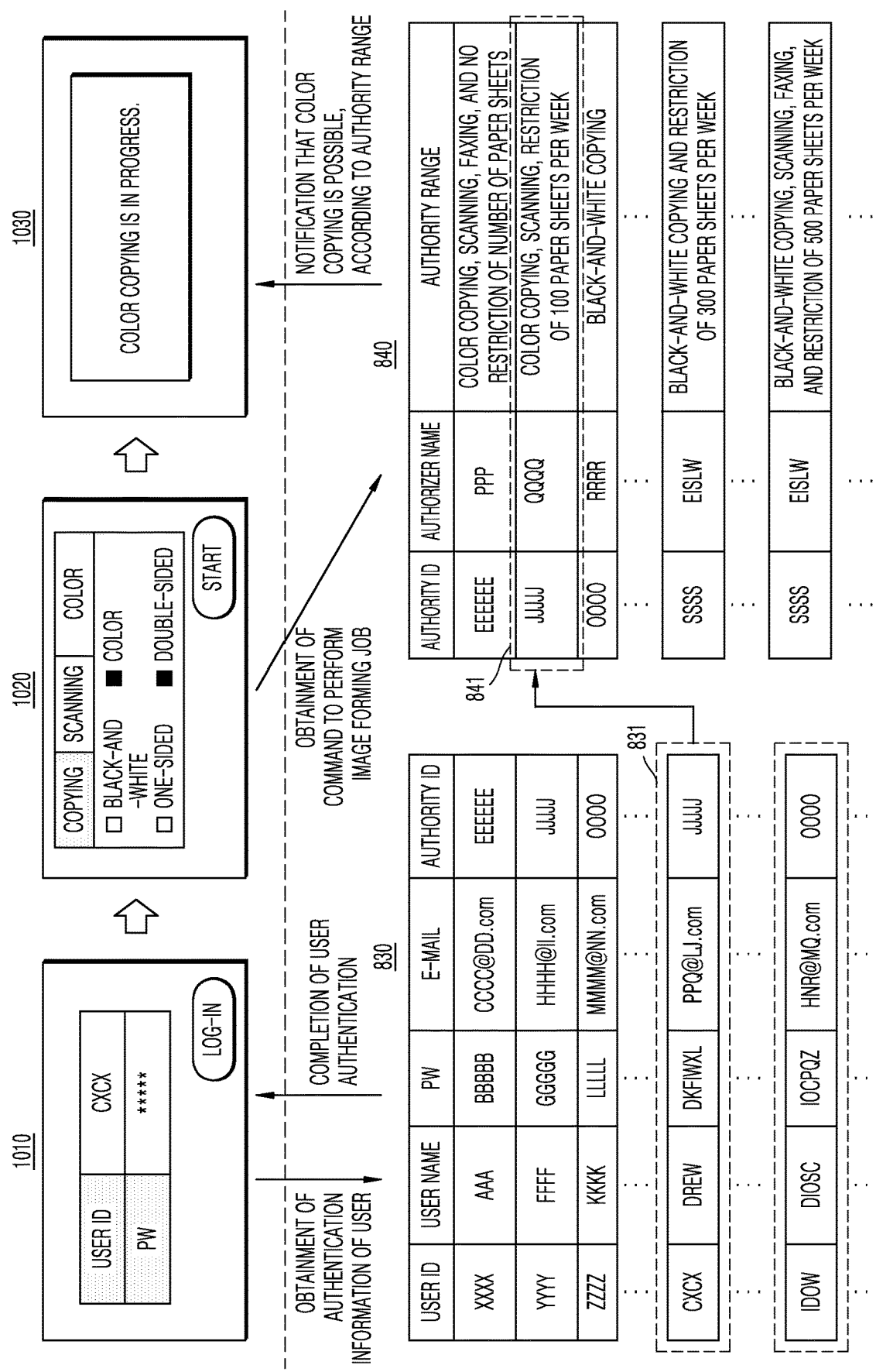
FIG. 10 is a diagram for explaining a process in which an image forming device performs user authentication and performs an image forming job according to an authority range by using reference account information stored based on a blockchain, according to an example.

FIG. 10 is a diagram for explaining a process in which an image forming device performs user authentication and performs an image forming job according to an authority range by using reference account information stored based on a blockchain, according to an example.

The first user may change the PW of the ID of the first user and may change the authority of the first user to use the image forming device. The first user may use the image forming device according to changed account information. The changed account information of the first user may be reflected in reference account information of a plurality of users stored in a storage and may be stored.

Referring to FIG. 10, the image forming device may receive second authentication information 1010 of the first user through a user interface device. For example, the image forming device may receive "CXCX" as an ID of the first user and "*****" as a PW of the first user.

The image forming device may authenticate the second authentication information 1010 of the first user, based on the reference account information 830 of the plurality of users stored in the storage 120. For example, when the second authentication information is identical with the changed first reference account information of the first user within the reference account information 830 of the plurality of users, the image forming device may authenticate the first user as a proper user of the image forming device.

The image forming device may receive a request 1020 to perform a first image forming job corresponding to "double-sided color copying" through the user interface device.

Referring to information indicating an authority range corresponding to an authority ID of the first user from among reference account information 840 of the plurality of users, the authority of the first user may be color copying, scanning, and a restriction of 100 paper sheets per week. The image forming device may display, through the user interface device, a message informing that the first image forming job of the first user is possible. The image forming device may perform a job of color-copying a certain document on both sides according to the request to perform the first image forming job. The image forming device may display a message 1030 indicating "Color copying is in progress", through the user interface device.

Figure 11:
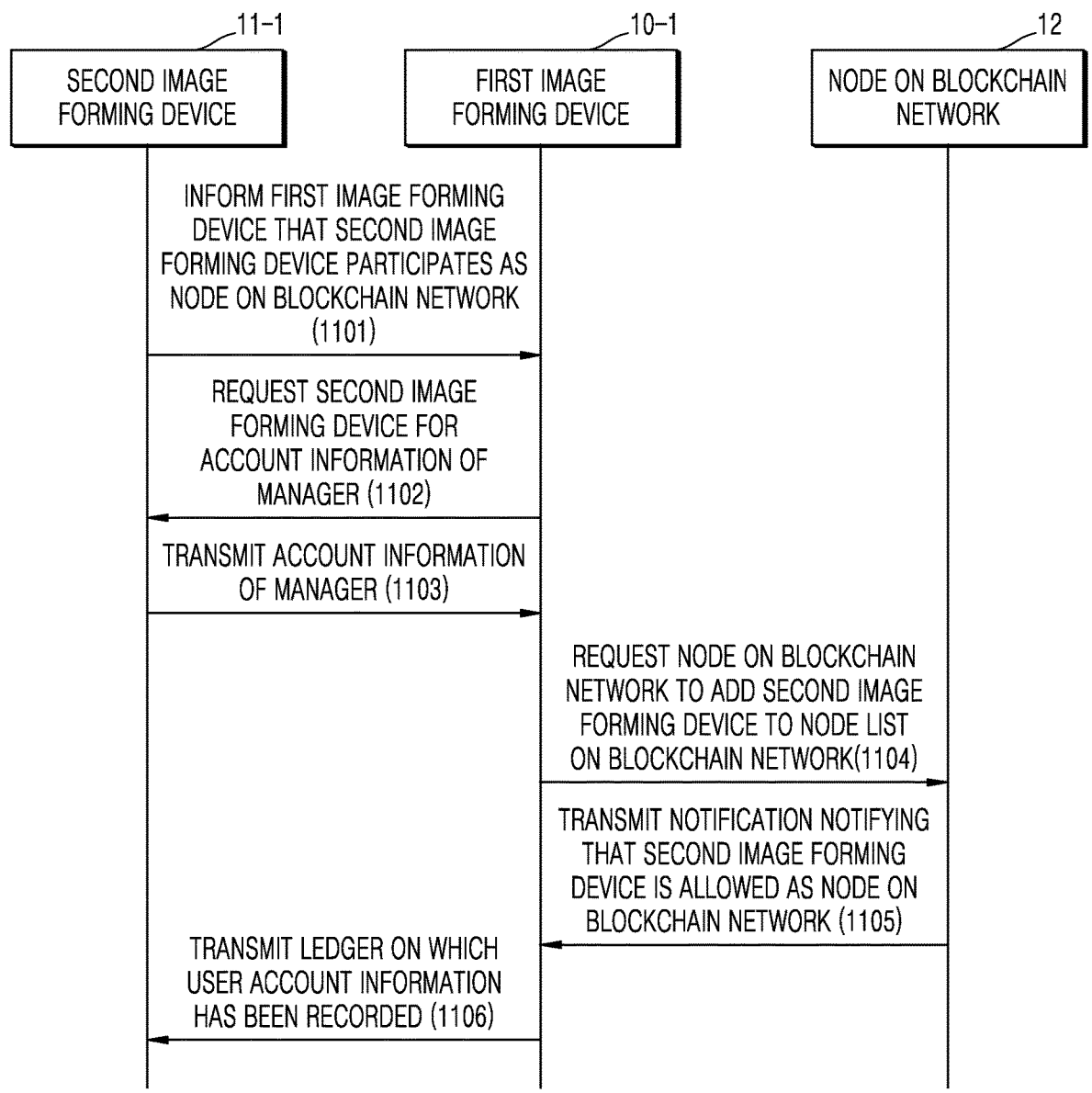
FIG. 11 is a flowchart of a process of adding a node to a network of a blockchain, according to an example.

FIG. 11 is a flowchart of a process of adding a node to a network of a blockchain, according to an example.

Referring to FIG. 11, in operation 1101, the second image forming device 11-1 may inform the first image forming device 10-1 that the second image forming device 11-1 participates as a node on the network of the blockchain. The first image forming device 10-1 may be a node on the network of the blockchain.

In operation 1102, the first image forming device 10-1 may request the second image forming device 11-1 for account information of a manager. The manager may be a manager approved by the nodes on the network of the blockchain. The account information of the manager may be information about an ID and a PW of the manager.

In operation 1103, the second image forming device 11-1 may transmit the account information of the manager to the first image forming device 10-1. In operation 1104, the first image forming device 10-1 may evaluate the account information of the manager and may authenticate the second image forming device 11-1. The first image forming device 10-1 may request a node 12 on the network of the blockchain to add the second image forming device 11-1 to a node list on the network of the blockchain. Although the node 12 on the network of the blockchain is one node in FIG. 11, the node 12 may be a plurality of nodes.

In operation 1105, the node 12 on the network of the blockchain may transmit, to the first image forming device 10-1, a notification notifying that the second image forming device 11-1 is allowed as a node on the network of the blockchain. In operation 1106, the first image forming device 10-1 may add the second image forming device 11-1 as a node on the network of the blockchain, and transmit, to the second image forming device 11-1, a ledger in which user account information has been recorded.

Figure 12:
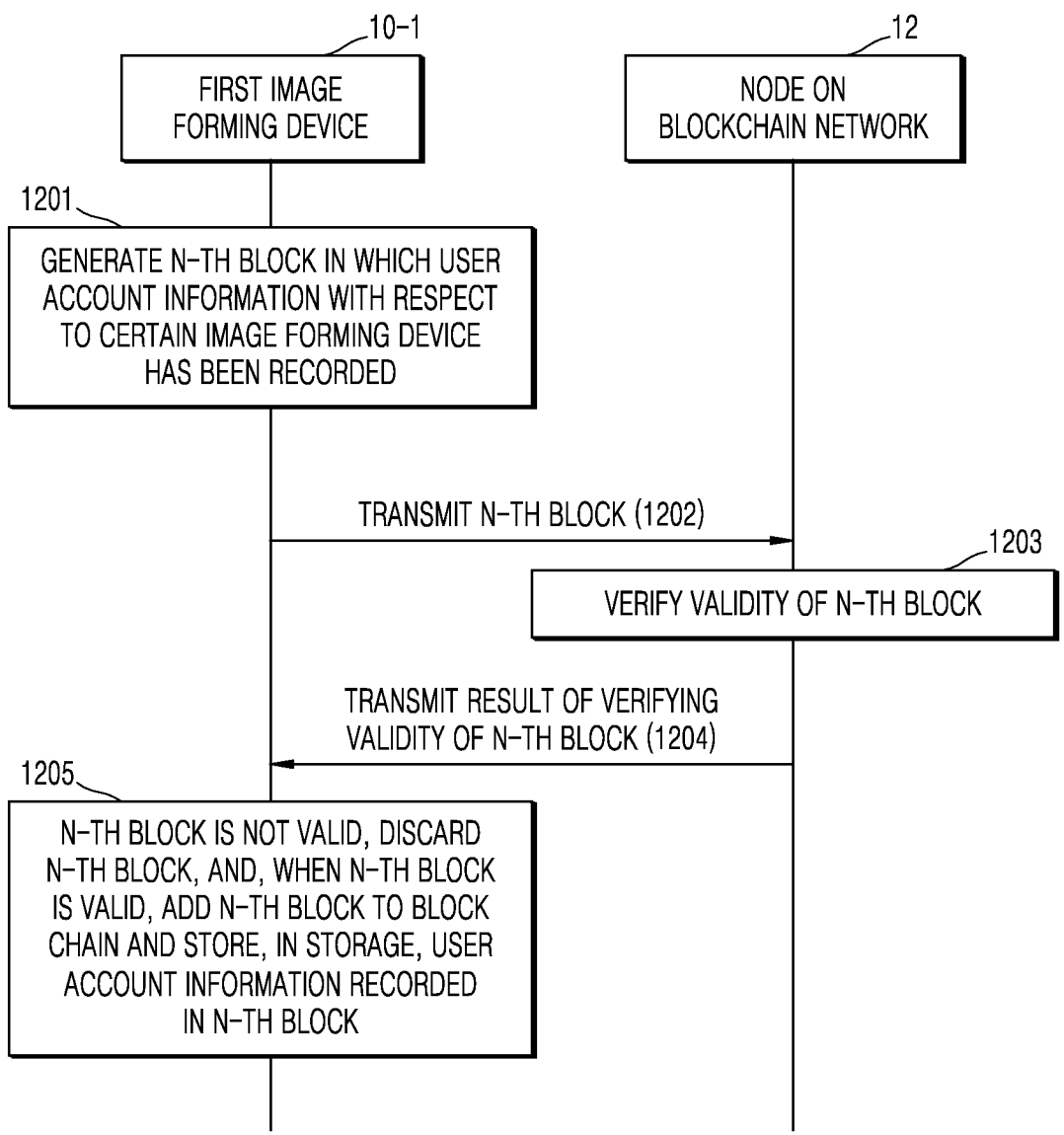
FIG. 12 is a flowchart of a process in which, when a block in which user account information has been recorded is generated, an image forming device adds the generated block to a blockchain and stores the user account information recorded in the block in a storage, according to an example.

FIG. 12 is a flowchart of a process in which, when a block in which user account information has been recorded is generated, an image forming device adds the generated block to a blockchain and stores the user account information recorded in the block in a storage, according to an example.

Referring to FIG. 12, in operation 1201, the first image forming device 10-1 may generate an $N^{th}$ block in which user account information with respect to a certain image forming device has been recorded. In operation 1202, the first image forming device 10-1 may transmit the $N^{th}$ block to the node 12 on the network of the blockchain. Although the node 12 on the network of the blockchain is illustrated as one node in FIG. 12, the node 12 may be a plurality of nodes.

In operation 1203, the node 12 on the network of the blockchain may verify validity of the $N^{th}$ block. As an example, the node 12 may verify the validity of the $N^{th}$ block by comparing a hash value of encrypted user account information in the $N^{th}$ block with a hash value of user account information. In operation 1204, the node 12 may transmit, to the first image forming device 10-1, a result of verifying the validity of the $N^{th}$ block.

In operation 1205, the first image forming device 10-1 may store, in a storage, the user account information recorded in the $N^{th}$ block, according to whether the $N^{th}$ block is valid. As an example, when the $N^{th}$ block is not valid, the first image forming device 10-1 may discard the $N^{th}$ block. On the other hand, when the $N^{th}$ block is valid, the first image forming device 10-1 may add the $N^{th}$ block to the block chain and store, in the storage, the user account information recorded in the $N^{th}$ block.

Figure 13:
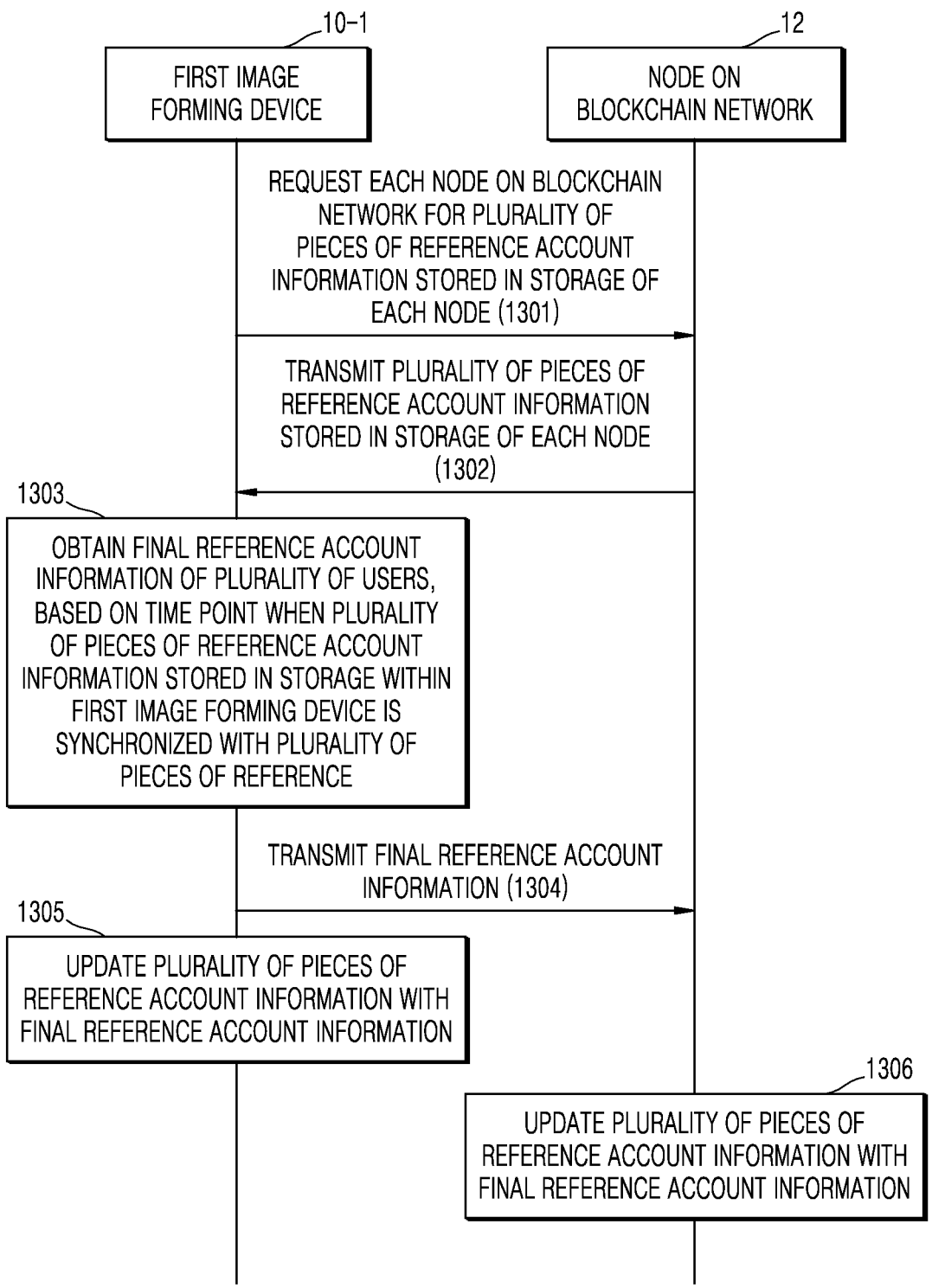
FIG. 13 is a flowchart of a process in which an image forming device obtains final reference account information, based on a time point at which reference account information stored in each of the nodes on a network of a blockchain has been updated, and transmits the final reference account information to each of the nodes, according to an example.

FIG. 13 is a flowchart of a process in which an image forming device obtains final reference account information, based on a time point at which reference account information stored in each of the nodes on a network of a blockchain has been updated, and transmits the final reference account information to each of the nodes, according to an example.

Referring to FIG. 13, the first image forming device 10-1 may request each node on the network of the blockchain for a plurality of pieces of reference account information stored in a storage of each node in operation 1301.

In operation 1302, the node 12 on the network of the blockchain may transmit, to the first image forming device 10-1, the plurality of pieces of reference account information stored in the storage of each node.

In operation 1303, the first image forming device 10-1 may obtain final reference account information of a plurality of users, based on a time point when a plurality of pieces of reference account information stored in a storage within the first image forming device 10-1 is synchronized with the plurality of pieces of reference account information stored in the storage of each node.

For example, when a time point when reference account information of a third user has been updated in the first image forming device 10-1 is earlier than a time point when reference account information of the third user has been updated in a certain node, the first image forming device 10-1 may determine that the reference account information of the third user updated in the certain node is the latest account information. The first image forming device 10-1 may determine the latest account information to be the final reference account information.

In operation 1304, the first image forming device 10-1 may transmit the final reference account information to the node 12 on the network of the blockchain. In operation 1305, the first image forming device 10-1 may update the plurality of pieces of reference account information with the final reference account information. In operation 1306, the node 12 on the network of the blockchain may update the plurality of pieces of reference account information with the final reference account information.

Figure 14:
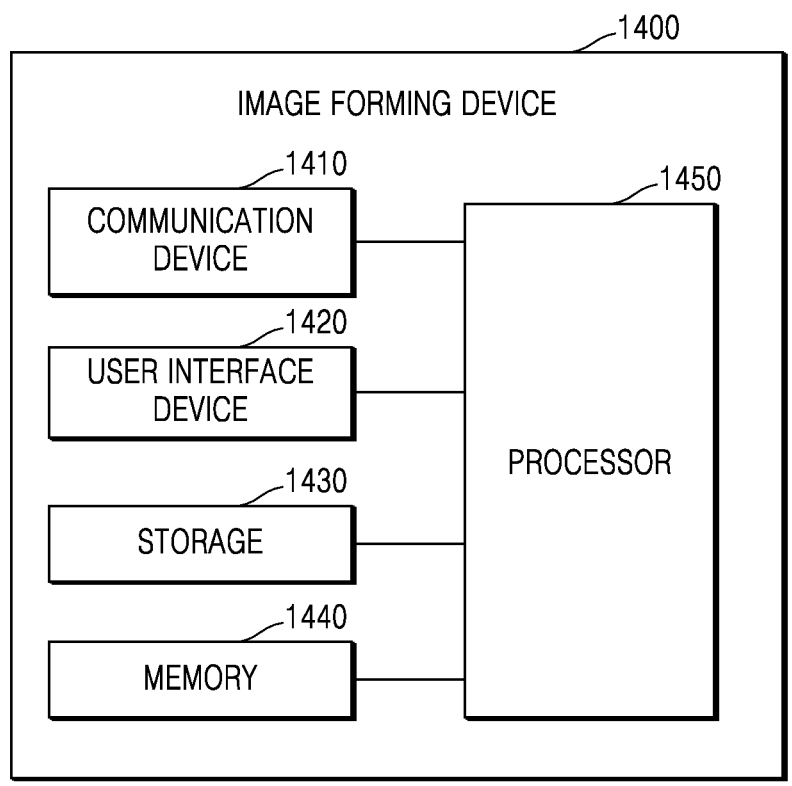
FIG. 14 is a block diagram of a structure of an image forming device, according to an example.

FIG. 14 is a block diagram of a structure of an image forming device, according to an example.

Referring to FIG. 14, an image forming device 1400 may include a communication device 1410, a user interface device 1420, a storage 1430, a memory 1440, and a processor 1450. The image forming device 1400 may be implemented by more or fewer components than those illustrated in FIG. 14.

The communication device 1410 may perform communication with an external apparatus. As an example, the communication device 1410 may be connected to a network by wire or wirelessly and perform communication with an external apparatus. The external apparatus may be a node that distributes and manages a ledger, based on a blockchain.

The communication device 1410 may include a communication module (e.g., a transceiver) that supports one of various wired/wireless communication methods. For example, the communication module may be in the form of a chipset, or may be a sticker/barcode (e.g., a sticker including a near field communication (NFC) tag) including information necessary for communication. The communication module may be a short-range communication module or a wired communication module.

The communication device 1410 may support, for example, a wireless local area network (LAN), wireless fidelity (WiFi), WiFi Direct, Bluetooth, a universal serial bus (USB), a wired LAN, NFC, or the like.

The user interface device 1420 may include an input interface for receiving an input or the like for performing an image forming job from a user, and an output interface for displaying information, such as a result of performing an image forming job or a status of the image forming device 1400. For example, the user interface device 1420 may include a manipulation panel that receives a user input, and a display panel that displays a screen image.

As an example, the input interface may include a device capable of receiving various types of user inputs, such as a keyboard, a physical button, a touch screen, a camera, a microphone, or the like. The output interface may include, for example, a display panel, a speaker, or the like. However, the user interface device 1420 is not limited thereto, and the user interface device 1420 may include a device that supports various inputs and outputs.

The storage 1430 may store reference account information of a plurality of users. As an example, the storage 1430 may store the reference account information of the plurality of users, based on a blockchain that distributes and manages a ledger in which user account information has been recorded. The storage 1430 may store the reference account information of the plurality of users synchronized with the user account information recorded on the ledger based on the block chain.

The memory 1440 may store programs, data, or files related to the image forming device 1400. The processor 1450 may execute the programs stored in the memory 1440, read the data or the files from the memory 1440, or store a new file in the memory 1440. The memory 1440 may store program commands, data files, data structures, or the like separately or in combinations. The memory 1440 may store instructions executable by the processor 1450.

The processor 1450 may control overall operations of the image forming device 1400, and may include at least one processor, such as a central processing unit (CPU). The processor 1450 may control the other components included in the image forming device 1400 to perform an operation corresponding to a user input received via the user interface device 1420. The processor 1450 may include at least one specialized processor corresponding to each function or may be an integrated processor.

The processor 1450 may receive first authentication information of a first user with respect to the image forming device 1400 through the user interface device 1420.

The processor 1450 may authenticate the first authentication information of the first user, based on the reference account information of the plurality of users stored in the storage 1430 based on the blockchain.

The blockchain may distribute and manage a ledger in which user account information has been recorded. The user account information may include authentication information used to authenticate a user of the image forming device 1400, and authority information indicating an authority range within which the user may use the image forming device 1400. The ledger may include a first ledger in which authentication information is recorded, and a second ledger in which authority information is recorded. The first ledger and the second ledger may exist independently.

When the authentication of the first user is completed, the processor 1450 may receive a request to perform a first image forming job, through the user interface device 1420.

The processor 1450 may evaluate first authority information indicating an authority range of the first user, based on the reference account information of the plurality of users. The processor 1450 may perform the first image forming job within the authority range of the first user.

The processor 1450 may generate a block in which the user account information with respect to the image forming device 1400 has been recorded.

For example, the processor 1450 may generate a first block in which certain authentication information of a new user or certain authority information of the new user has been recorded.

As another example, the processor 1450 may generate a second block in which changed information obtained by changing second authentication information or second authority information of a second user from among a plurality of users has been recorded. The plurality of users are users of which user account information has been recorded within the blocks of a blockchain.

When validity of the generated block is verified from nodes within the network of the blockchain, the processor 1450 may add the generated block to the blockchain. The processor 1450 may store, in the storage 1430, the user account information with respect to the image forming device 1400 recorded in the generated block.

For example, the processor 1450 may generate a second block in which second account information of a second user has been recorded. The processor 1450 may receive, from a certain node from among the nodes through the communication device 1410, a third block in which third account information of a second user has been recorded. The processor 1450 may determine, as a valid block, a block corresponding to an earlier time point from among a time point at which the second account information is agreed from the nodes and a time point at which the third account information is agreed from the nodes. The processor 1450 may add the valid block to the blockchain.

For example, the processor 1450 may generate account information of a new user including at least one piece of information recorded in the first block. The processor 1450 may add the account information of the new user to the reference account information of the plurality of users stored in the storage 1430.

As another example, the processor 1450 may update the second reference account information of the second user stored in the storage 1430, based on the changed information of the user account information of the second user recorded in the second block.

As another example, the processor 1450 may receive a request for a plurality of pieces of user account information from an external image forming device other than the nodes within the network of the blockchain, through the communication device 1410. The processor 1450 may synchronize the reference account information of the plurality of users stored in the storage 1430 with the user account information recorded in the ledger. The processor 1450 may transmit the reference account information of the plurality of users to an external image forming device, through the communication device 1410.

The processor 1450 may transmit, to the nodes within the network of the blockchain, the block in which the user account information with respect to the image forming device 1400 has been recorded through the communication device 1410, based on the blockchain.

The processor 1450 may determine whether the reference account information of the plurality of users stored in the storage 1430 has been periodically synchronized with the user account information recorded in the ledger based on the blockchain. The processor 1450 may update the reference account information of the plurality of users stored in the storage 1430, based on a result of the determination of synchronization or non-synchronization.

The processor 1450 may receive a request from the image forming device 1400 through the communication device 1410, the request indicating participation as a node on the network of the blockchain. The processor 1450 may receive a message from the nodes on the network of the blockchain through the communication device 1410, the message indicating that the request of participation of the image forming device 1400 as a node within the network of the blockchain is approved. The processor 1450 may transmit the ledger to the image forming device 1400 through the communication device 1410.

The processor 1450 may request each node within the network of the blockchain for a plurality of pieces of reference account information stored in each node through the communication device 1410 and may receive the plurality of pieces of reference account information stored in each node from each node. The processor 1450 may obtain final reference account information of the plurality of users, based on a time point when the reference account information of the plurality of users stored in the storage 1430 is synchronized with the plurality of pieces of reference account information stored in each node. The processor 1450 may transmit the final reference account information to each node through the communication device 1410.

The above-described operating methods may be embodied in the form of a computer-readable recording medium storing computer-executable instructions or data. The above-described examples can be written as computer programs and can be implemented in general-use digital computers that execute the programs using a computer-readable recording medium. Examples of the computer-readable recording medium may include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, a magnetic tape, a floppy disk, a magneto-optical data storage device, an optical data storage device, a hard disk, a solid-state disk (SSD), and any device capable of storing an instruction or software, related data, a data file, and data structures and providing the instruction or software, the related data, the data file, and the data structures to a processor or a computer such that the processor or the computer execute the instruction.

While the disclosure has been particularly shown and described with reference to examples thereof, it will be understood by those of ordinary skill in the art that various changes in form and details may be made therein without departing from the spirit and scope of the disclosure as defined by the following claims. For example, an appropriate result may be attained even when the above-described techniques are performed in a different order from the above-described method, and/or components, such as the above-described system, structure, device, and circuit, are coupled or combined in a different form from the above-described methods or substituted for or replaced by other components or equivalents thereof.

Therefore, the scope of the present disclosure is defined not by the detailed description of examples but by the appended claims and equivalents to the appended claims.

What is claimed is:

1. An operating method of an image forming device, the operating method comprising:
   receiving first authentication information of a first user with respect to the image forming device;
   authenticating the first authentication information of the first user, based on reference account information of a plurality of users, the reference account information being stored in a storage based on a blockchain that distributes and manages a ledger in which user account information including authentication information and authority information of a user with respect to a certain image forming device has been recorded;
   when the authentication of the first user is completed, receiving a request to perform a first image forming job; and
   evaluating first authority information indicating an authority range of the first user, based on the reference account information of the plurality of users, and performing the first image forming job within the authority range of the first user.

2. The operating method of claim 1, further comprising:
   generating a block in which the user account information with respect to the certain image forming device has been recorded; and
   when validity of the generated block is verified from nodes within a network of the blockchain, adding the generated block to the blockchain and storing, in the storage, the user account information with respect to the certain image forming device recorded in the generated block.

3. The operating method of claim 2, further comprising transmitting, to the nodes within the network of the blockchain, the block in which the user account information with respect to the certain image forming device has been recorded, based on the blockchain.

4. The operating method of claim 2,
   wherein the generating of the block in which the user account information with respect to the certain image forming device has been recorded comprises generating a first block in which certain authentication information of a new user or certain authority information of the new user has been recorded, and
   wherein the storing of the user account information with respect to the certain image forming device in the storage comprises generating account information of the new user including the certain authentication information or certain authority information recorded on the first block, and adding the generated account information of the new user to the reference account information stored in the storage.

5. The operating method of claim 2,
   wherein the generating of the block in which the user account information with respect to the certain image forming device has been recorded comprises generating a second block in which changed information obtained by changing second authentication information or second authority information of a second user from among the plurality of users has been recorded, and
   wherein the storing in the storage of the user account information with respect to the certain image forming device comprises updating, based on the change information recorded on the second block, second reference account information of the second user stored in the storage.

6. The operating method of claim 2,
wherein the generating of the block in which the user account information with respect to the certain image forming device has been recorded comprises generating a second block in which second account information of a second user from among the plurality of users has been recorded, and
wherein the adding of the generated block to the blockchain when validity of the generated block is verified from nodes within the network of the blockchain comprises:
  receiving, from a certain node from among the nodes, a third block in which third account information of the second user has been recorded; and
  determining, as a valid block, a block corresponding to an earliest time point from among a time point at which the second account information is agreed from the nodes and a time point at which the third account information is agreed from the nodes.

7. The operating method of claim 1, wherein the ledger comprises:
  a first ledger in which authentication information used to identify a user of the certain image forming device has been recorded; and
  a second ledger in which authority information indicating an authority range allowed for the user with respect to the certain image forming device.

8. The operating method of claim 1, further comprising:
  determining if the reference account information of the plurality of users stored in the storage has been periodically synchronized with the user account information recorded on the ledger based on the blockchain; and
  based on a result of the determination of synchronization, updating the reference account information of the plurality of users stored in the storage.

9. The operating method of claim 1, further comprising:
  receiving, from a second image forming device, a request to participate as a node within the network of the blockchain;
  receiving a message indicating that the request from the second image forming device is allowed, from nodes within the network of the blockchain; and
  transmitting the ledger to the second image forming device.

10. The operating method of claim 1, further comprising:
  receiving a request for user account information of the plurality of users from an external image forming device other than the nodes within the network of the blockchain;
  synchronizing the reference account information of the plurality of users stored in the storage with the user account information recorded on the ledger based on the blockchain; and
  transmitting the reference account information of the plurality of users to the external image forming device.

11. The operating method of claim 1, further comprising:
  requesting a k-th node within the network of the blockchain for a plurality of pieces of reference account information stored in the k-th node, and receiving the plurality of pieces of reference account information stored in the k-th node from the k-th node, wherein 0<k≤n, and k is an integer;
  obtaining final reference account information of the plurality of users, based on a time point when the reference account information of the plurality of users stored in the storage is synchronized with the plurality of pieces of reference account information stored in the k-th node; and
  transmitting the final reference account information to the k-th node.

12. A non-transitory computer program product comprising one or more computer-readable recording mediums having recorded thereon instructions, which, when executed by a computer, perform an operating method of an image forming device, the product comprising:
  instructions to receive first authentication information of a first user with respect to the image forming device;
  instructions to authenticate the first authentication information of the first user, based on reference account information of a plurality of users, the reference account information being stored in a storage based on a blockchain that distributes and manages a ledger in which user account information including authentication information and authority information of a user with respect to a certain image forming device has been recorded;
  instructions to, when the authentication of the first user is completed, receive a request to perform a first image forming job; and
  instructions to evaluate first authority information indicating an authority range of the first user, based on the reference account information of the plurality of users, and perform the first image forming job within the authority range of the first user.

13. An image forming device comprising:
  a communication device;
  a user interface device;
  a storage;
  a processor; and
  a memory storing instructions executable by the processor,
  wherein the processor is to execute the instructions to:
    receive first authentication information of a first user with respect to the image forming device, through the communication device;
    authenticate the first authentication information of the first user, based on reference account information of a plurality of users, the reference account information being stored in the storage based on a blockchain that distributes and manages a ledger in which user account information including authentication information and authority information of a user with respect to a certain image forming device has been recorded;
    when authentication of the first user is completed, receive a request to perform a first image forming job, through the user interface device; and
    evaluate first authority information indicating an authority range of the first user, based on the reference account information of the plurality of users, and perform the first image forming job within the authority range of the first user.

14. The image forming device of claim 13, wherein the processor is further to execute the instructions to:
  generate a block in which the user account information with respect to the certain image forming device has been recorded; and
  when validity of the generated block is verified from nodes within a network of the blockchain, add the generated block to the blockchain and store, in the storage, the user account information with respect to the certain image forming device recorded in the generated block.

15. The image forming device of claim 13, wherein the processor is further to execute the instructions to:

determining if the reference account information of the plurality of users stored in the storage has been periodically synchronized with the user account information recorded on the ledger based on the blockchain; and based on a result of the determination of synchronization, update the reference account information of the plurality of users stored in the storage.

* * * * *